United States Patent [19]

Blitstein et al.

[11] 4,403,048
[45] Sep. 6, 1983

[54] CORROSION-RESISTANT COATING COMPOSITION CONTAINING HOLLOW MICROBALLOONS

[75] Inventors: John Blitstein, Chicago; Donald Kathrein, Northbrook, both of Ill.

[73] Assignee: T C Manufacturing Company, Evanston, Ill.

[21] Appl. No.: 419,219

[22] Filed: Sep. 17, 1982

Related U.S. Application Data

[62] Division of Ser. No. 271,437, Jun. 8, 1981, Pat. No. 4,374,874, which is a division of Ser. No. 176,470, Aug. 8, 1980, Pat. No. 4,307,142.

[51] Int. Cl.$^3$ .............................................. C08K 7/28
[52] U.S. Cl. ................................... 523/218; 523/219; 524/546
[58] Field of Search ............... 523/218, 219, 546, 365; 106/14.44

[56] References Cited

U.S. PATENT DOCUMENTS 4,183,837  1/1980  Tamura et al. ...................... 524/365
4,185,000  1/1980  Gebauer et al. ..................... 523/219

FOREIGN PATENT DOCUMENTS 51823     5/1982  European Pat. Off. ............ 523/219
49-29337  3/1974  Japan .................................... 523/219

*Primary Examiner*—Lewis T. Jacobs
*Attorney, Agent, or Firm*—McWilliams, Mann, Zummer & Sweeney

[57] ABSTRACT

A fluoroelastomer hollow glass microsphere coating has been found to provide new and unexpected corrosion resistance to metal surfaces for protection against severely corrosive environments. The coating comprises a fluorocarbon elastomer and 3–50% by volume of hollow glass microspheres or microballoons having a size in the range of about 2–300 microns, preferably 20–200 microns. The hollow glass microspheres or microballoons substantially increases the corrosion resistance of a fluoroelastomeric liquid composition, yielding new and unexpected thermal and chemical resistance, particularly when the coating composition is applied in two or more layers.

7 Claims, No Drawings

CORROSION-RESISTANT COATING COMPOSITION CONTAINING HOLLOW MICROBALLOONS

This is a division of application Ser. No. 271,437, filed June 8, 1981, now U.S. Pat. No. 4,374,874, which is a division of Ser. No. 176,470 filed Aug. 8, 1980, now U.S. Pat. No. 4,307,142.

FIELD OF THE INVENTION

The present invention relates to a coating composition capable of providing substrates, particularly metallic substrates, with new and unexpected resistance to corrosion caused by chemicals, particularly at high temperatures. More specifically, the coating composition of the present invention includes a temperature resistant fluoroelastomer containing 3–50% by volume hollow glass microballoons. The coating composition is particularly desirable for coating the interior surfaces of industrial chimneys, particularly those chimneys where the interior surfaces are exposed to hot boiler flue gases containing sulfur, for protecting metal, interior surfaces against chemically induced corrosion. The composition of the present invention is useful for coating any substrate, particularly a metallic surface, subjected to a chemically and/or thermally severe corrosive environment.

BACKGROUND OF THE INVENTION

Flue gases of industrial furnaces commonly contain a severely corrosive amount of fly ash and sulfur-containing gases and particularly sulfur oxides such as $SO_2$ and $SO_3$. When such sulfur containing flue gases contact an uncoated interior metal surface of a chimney or stack, particularly under high temperatures above about 200° F., the interior stack surfaces are severely corroded within a short period of time. Accordingly, it is a common practice to wet scrub a flue gas for sulfur removal not only to meet the governmental pollution standards but also to protect the interior stack surfaces. Commonly, in industries such as power generation stations where it is known that there will be a relatively high percentage of sulfur in the flue gases, and where very tall, i.e. 600 foot stacks are necessary, the interior surfaces of these stacks may be lined with super stainless steel which will not rust even under very extremely corrosive conditions. However, sections of the stainless steel stack linings must be welded, and the weld locations become an extremely desirable attack site for high temperature catalyzed chemical corrosion.

PRIOR ART

A number of patents disclose the use of solid glass fibers or glass spheroids as fillers for polymeric materials: Barnhart et al U.S. Pat. No. 2,914,500; Poole U.S. Pat. No. 3,036,928; Rising et al U.S. Pat. No. 3,056,709; Williams U.S. Pat. No. 3,249,947; De Fries U.S. Pat. No. 3,288,618; McFadden U.S. Pat. No. 3,473,952; Iseki et al U.S. Pat. No. 4,026,863. Further, a number of Veatch et al patents disclose the manufacture of hollow glass spheres as fillers for plastics, concrete, plaster and the like: U.S. Pat. Nos. 2,797,201; 2,978,339; 2,978,340; and 3,030,215. A patent to D'Asto U.S. Pat. No. 3,281,308 discloses the desirability of coating the interior surface of industrial chimneys which are subjected to the combined effects of severely corrosive environments and a relatively high temperature.

SUMMARY OF THE INVENTION

In brief, the present invention relates to a corrosion resistant coating for protecting substrate, i.e. metal, surfaces against severely corrosive environments. The coating comprises a fluorocarbon elastomer and 3–50% by volume of hollow glass microspheres or microballoons having a size in the range of about 2–300 microns, preferably 20–200 microns. Fluoroelastomer flexible protective coatings are well known in the art to have outstanding resistance to attack by chemicals, fluids and heat. It has been found that the incorporation of 3–50% by volume of hollow glass microspheres or microballoons into a fluoroelastomeric liquid composition, prior to coating, provides a substrate coating with new and unexpected thermal and chemical resistance, particularly when applied in two or more layers.

Accordingly, an object of the present invention is to provide a new and improved fluoroelastomeric liquid coating composition containing hollow glass microspheres.

Another object of the present invention is to provide a new and improved liquid polymeric coating composition, containing 3–50% by volume hollow glass microspheres, having new and unexpected corrosion resistance when coated over a metal substrate.

Another object of the present invention is to provide a corrosion resistant chimney or flue by coating the interior surface of a chimney or flue with a composition comprising a fluoroelastomeric, inert heat-resistant polymeric material containing 3–50% by volume of hollow glass microspheres having a diameter in the range of 2–300 microns.

These and other objects and advantages of the present invention will be better understood with reference to the following detailed description of a preferred embodiment.

DETAILED DESCRIPTION OF A PREFERRED EMBODIMENT

The fluorocarbon elastomers useful in accordance with the present invention include any of the fluoroelastomers having sufficient temperature resistance for the particular environment of use. Generally, the useful fluoroelastomers have molecular weights in the range of 10,000–10,000,000 and include any of the polyfluorinated polyolefins and polyfluorinated polyolefin copolymers, such as trifluorochloroethylene, copolymers of trifluorochloroethylene and vinylidene fluoride; polytetrafluoroethylene; copolymers of tetrafluoro ethylene and perfluoropropene; copolymers of tetrafluoroethylene and chlorotrifluoroethylene; copolymers of tetrafluoroethylene with other fluorinated olefins; and copolymers of hexafluoropropylene and vinylidene fluoride manufactured by E. I. DuPont De Nemours & Company under the mark VITON; and mixtures thereof.

The copolymer of hexafluoropropylene and vinylidene fluoride (VITON) is well known to possess exceptional resistance to oils and chemicals at elevated temperatures. Quite surprisingly, it has been found that the inclusion of hollow glass microspheres in an amount of 3–50% by volume to a polyolefinic fluoroelastomer, such as the copolymer of hexafluoropropylene and vinylidene fluoride, substantially increases the chemical resistance of the fluoroelastomer at elevated temperatures.

The hollow glass microspheres useful in accordance with the present invention can be any inert, hollow temperature resistant spheres ranging in diameter from about 2 to about 300 microns. It is preferred to incorporate hollow glass (i.e. sodium borosilicate) microspheres having a diameter in the range of 20-200 microns. Exceptionally good results have been obtained when more than 50% by weight of the hollow glass microspheres have a diameter in the range of 50-150 microns.

The coating composition of the present invention is prepared by dissolving the fluoroelastomer in a suitable, volatile solvent. Volatile, low molecular weight ketones, such as acetone, are particularly good solvents for the fluoroelastomers used in the coating composition of the present invention. Generally, the fluoroelastomer is added to 100-400% by weight of the solvent, based on the weight of the fluoroelastomer, to obtain a suitably fluid, liquid fluoroelastomer composition for coating. The hollow glass microspheres are added to the liquid solution of fluoroelastomer in an amount of 3-50% by volume of fluoroelastomer plus microspheres. The hollow glass microspheres are fragile, thin-walled particles so that mixing of the microspheres into the liquid fluoroelastomer composition must be done carefully, such as by hand mixing or by closed container rotation, for example on a paint can roller machine or shaker. During storage, some of the microspheres will rise to the top of a storage container forming a non-liquid layer. Accordingly, the floating microspheres should be re-suspended in the liquid fluoroelastomer composition immediately prior to use, such as by hand mixing to obtain a generally homogeneous liquid fluoroelastomer solution containing a generally evenly dispersed quantity of hollow microspheres.

Prior to coating a metal substrate with the fluoroelastomer-microsphere composition of the present invention, the metal substrate should be thoroughly cleaned such as by grit blasting and degreasing to ensure adequate coating adhesion. The homogeneous fluoroelastomer composition containing dispersed hollow microspheres is coated over a substrate for example, by brush, paint roll, swab coater, or other means which will not fracture the hollow microspheres. It has been found that spray application of the composition of the present invention damages a significant number of the hollow microspheres so that spray coating is not recommended. The composition of the present invention should be dried after coating to remove substantially all of the solvent prior to application of additional coatings and prior to curing to prevent solvent blistering in the coating layers. The total thickness can be about 1 to 60 mils, generally 1 to 20 mils is sufficient for corrosion protection. It has been found that approximately 45 minutes at ambient conditions is sufficient to dry a 2 to 20 mil coating thickness of the composition of the present invention when a very volatile, low molecular weight solvent, such as acetone, is used as the fluoroelastomer solvent.

After complete drying of the coatings of the present invention, the fluoroelastomer is cured in any suitable manner, such as by baking the coating at 400° F. for a period of time of from one to eight hours. In accordance with an important feature of the present invention, during drying of the composition, the hollow microspheres demonstrate a tendency to rise to the exposed surface and the fluoroelastomer shrinks around the hollow spheroids to provide a thin film of fluoroelastomer completely encapsulating the outermost exterior of the spheroids. This fluoroelastomeric film covering the hollow microspheres remains intact through the curing process and during the service life of the coating. The protruding surface layer of encapsulated hollow glass microspheres insulates and protects the innermost, generally planer layer of fluoroelastomer and unexpectedly increases the capability of the fluoroelastomer to protect a metal surface from the combined corrosive attack of heat and chemicals.

In accordance with an important feature of the present invention, a second coating layer of the composition of the present invention unexpectedly improves the performance of the coating composition by nesting the second layer of hollow microspheres, from the second coating, within the spaces formed between adjacent, protruding, fluoroelastomer-encapsulated hollow microspheres of the first coating layer to provide a metal substrate entirely coated with a heat and chemical resistant, generally planar layer of fluoroelastomer covered by a substantially completely protecting shield formed by an uppermost layer of fluoroelastomer-encapsulated hollow glass microspheres.

EXAMPLE I

One hundred grams of a copolymer of hexafluoropropylene and vinylidene fluoride is dissolved in 300 grams of acetone to form the fluoroelastomer solution. Then 10 grams of hollow sodium borosilicate glass microspheres having the following particle size distribution and density are hand stirred into the fluoroelastomer solution:

| Particle Size Range, Microns (% by weight) | |
|---|---|
| 175 (5) | 100— 125 (12) |
| 149-175 (10) | 62— 100 (44) |
| 125-149 (12) | 44— 62 (10) |
| 44 (7) | |
| Average Particle Diameter, Microns (weight basis) | 80 |
| Density | .311 grams/cc. |

The resulting composition contains about 24.4% by weight fluoroelastomer and about 2.4% by weight hollow microspheres representing approximately 30% by volume of the composition after solvent removal.

A steel substrate is first grit blasted and then degreased. A first coating of the fluoroelastomer composition of example 1 is brush-applied and allowed to dry for 45 minutes at ambient temperature. A second coating is then brush-applied over the dried first coating and the second coating is allowed to dry for 12 hours. The coated substrate is then baked at 400° F. for 8 hours to affect a complete cure of the fluoroelastomer.

Comparitive testing was performed to determine the effect of incorporation of the hollow glass microspheres by comparing the corrosion protecting capabilities of the fluoroelastomer composition with hollow glass microspheres to the fluoroelastomer composition without the hollow glass microspheres. Two identical fluoroelastomer solutions were prepared by dissolving equal amounts of a copolymer of hexafluoropropylene and vinylidene fluoride into acetone. Hollow glass microspheres were then hand stirred into one of the fluoroelastomer solutions in an amount of 30% by volume of fluoroelastomer plus microspheres. The two fluoroelastomer compositions then were coated on a steel plate using approximately equal amounts of fluoroelastomer in each coating, and the coatings were dried and cured.

Acid tests of the two coatings show that the hollow glass microspheres used in accordance with the present invention approximately double the acid resistance of the steel substrate coated, as shown in Table I.

TABLE I

|  | Copolymer of Hexafluoropropylene and Vinylidene Fluoride (Without Microspheres) | Copolymer of Hexafluoropropylene And Vinylidene Fluoride And 30% By Weight Volume |
|---|---|---|
| Coats | 2 | 2 |
| Total Thickness | 2 Mil | 4 Mil |
| Bake | 1 Hr. at 400° F. | 1 Hr. at 400° F. |
| Acid Test Temp. | 500° F. | 500° F. |
| Acid Drops (90% $H_2SO_4$) | 10 | 14 |
| Time To Failure | 4 Hours | 6¼ Hrs. |
| Acid Failure Diameter | 17.5 mm | 12.0 mm |
| High Temp. | Over 600° F. | Over 600° F. |
| High Temp. Failure Area | 100.0 mm | 53.0 mm |

The composition of the present invention also was tested in comparison to a fluoroelastomer composition containing solid glass microspheres. Two identical fluoroelastomer solutions (hexafluoropropylene-vinylidene fluoride copolymer) were prepared in the same manner as the compositions of Table I. 30% by volume solid glass microspheres were added to one solution and 30% by volume hollow glass microspheres added to the other solution. The hollow and solid microspheres had approximatley the same particle size distribution. In a third, identical fluoroelastomer solution 75% by volume solid glass microspheres were added. Three steel substrate surfaces then were grit blasted and degreased and each surface was coated with one of the prepared fluoroelastomer compositions, and the coatings were dried and cured. Acid drops (90% $H_2SO_4$) were then placed over the coatings and the coatings were observed at ambient temperatures. After 30 days exposure to 90% $H_2SO_4$ it was found that the composition containing the hollow glass microspheres is 10 times more acid resistant than the composition containing an equal volume of solid microspheres, as set forth in Table II.

TABLE II

| BEAD TYPE | BEAD VOL. RATIO | AVG. DIAMETER OF ATTACK | AVG. AREA OF ATTACK |
|---|---|---|---|
| Hollow | 1.0 | .281" | .062 sq. in. |
| Solid | 1.0 | .875" | .601 sq. in. |
| Solid | 2.5 | 1.000" | .786 sq. in. |

It was found that the coating having two and one half times the percent by volume of solid glass microspheres was actually more receptive to acid attack.

Steel substrates then were twice coated with the composition of the present invention and tested for acid resistance at ambient and elevated temperatures. Two coatings approximately two mils each in thickness were applied to a steel substrate by brush-applying. The first coating was allowed to dry at ambient temperature for 45 minutes and the second coating was allowed to dry at ambient temperature for 12 hours to assure complete drying. After complete drying, the coating was baked at 400° F. for 1 hour to cure the fluoroelastomer. The three compositions set forth in Table II, each comprising a copolymer of hexafluoropropylene and vinylidene fluoride, acetone, and either hollow or solid glass microspheres were twice coated on the steel substrate, dryed and cured. The two fluoroelastomer compositions having 30% by volume glass microspheres were applied in a thickness of 9 mils whereas the composition containing 75% by volume solid glass microspheres was applied in a thickness of 14 mils to achieve a coating having about the same amount of fluoroelastomer. All three coatings were subjected to 90% $H_2SO_4$ drops at ambient temperature for 72 hours. The composition containing approximately 30% by volume of solid glass microspheres developed acid attack rings around the acid drops during this 72 hour ambient temperature test while the composition containing approximately 30% by volume of hollow glass microspheres and the composition containing approximately 75% by volume of solid glass microspheres each remained inert during the 72 hour ambient test.

The steel substrates twice coated with the composition containing approximately 30% by volume of hollow glass microspheres (9 mils thick) and the steel substrate twice coated with the composition containing approximately 75% by volume of solid glass microspheres (14 mils thick) were then subjected to $H_2SO_4$ tests at elevated temperatures. The steel substrates were subjected to two drops of 90% $H_2SO_4$ and the substrates were heated to 475° F. The substrate coated with the composition containing approximately 75% by volume solid glass microspheres showed the first sign of failure in the development of a blister in the coating, while the composition of the present invention containing approximately 30% by volume hollow glass microspheres only showed a slight darkening during the same time period 2 drops, one hour. The two layer coating of the composition of the present invention, applied in a 9 mil total thickness, did not experience coating failure until 14 drops of 90% $H_2SO_4$ were applied to the coated surface and the surface heated to 475° F. for a period of 7½ hours. When the substrate twice coated with the composition containing 75% by volume solid glass microspheres, applied in a 14 mil thickness, was subjected to the same conditions 14 drops 90% $H_2SO_4$ for a 7 and ½ hour period at 475° F., vast corrosion developed.

It was also found in acid testing that a steel substrate coated with two coats of a copolymer of hexafluoropropylene and vinylidene fluoride without any glass microspheres develops coating failure in only ½ hour when the coating is subjected to one drop of 90% $H_2SO_4$ at 475° F.

Coating life of the composition of the present invention increases with added number of coats. It has been found that a second coating of the composition of the present invention over a metal substrate increases the service life of the coating by about 300% with the third and subsequent coatings increasing the service life by an average of 200% per additional coating, as shown in Table III.

TABLE III

| Number of Coats | Total Thickness | Drops Of 90% $H_2SO_4$ | Failure Time | Percent Increase/ Coat | Test Temp. |
|---|---|---|---|---|---|
| 1 | 4 Mil | 1 | ½ Hr. | — | 500° F. |
| 2 | 6 Mil | 3 | 1½ Hr. | 300% | 500° F. |
| 5 | 13 Mil | 10 | 6 Hr. | 200% | 500° F. |

Surprisingly, it has been found that with two coatings of the composition of the present invention over a steel substrate there is no sign of coating failure after three weeks exposure to 60% and 90% $H_2SO_4$ under ambient temperature, as shown in Table IV.

TABLE IV

| Temp. | $H_2SO_4$ Conc. | Drops Of Acid | Time To Failure |
|---|---|---|---|
| Ambient | 60% & 90 | One | No Failure After Three Weeks |
| Ambient to 250° F. | 60% & 90% | One | No Failure After Three Weeks |
| 450° F. | 60% | 24 Drops | 23 Hours |
| 450° F. | 90% | 6 Drops | 5.5 Hours |
| 500° F. | 60% | 37 Drops | 19.5 Hours |
| 500° F. | 90% | 2 Drops | 2 Hours |
| 550° F. | 60% | 4 Drops | 2.3 Hours |
| 550° F. | 90% | 2 Drops | 50 Min. |
| 600° F. | 60% | 2 Drops | 1 Hour |
| 600° F. | 90% | 1 Drop | 30 Min. |

It should be understood that numerous other modifications and embodiments can be devised by those skilled in the art that will fall within the spirit and scope of the principles of this invention.

What is claimed as new and desired to be secured by Letters Patent is:

1. A composition of matter comprising a fluoroelastomer dissolved in a solvent capable of dissolving said fluoroelastomer in an amount sufficient to provide a liquid, spreadable solution of fluoroelastomer, and a plurality of hollow microspheres having a particle size in the range of about 2 to about 300 microns in an amount of about 3 to about 50 percent based on the total volume of fluoroelastomer plus microspheres.

2. A composition as defined in claim 1 wherein said fluoroelastomer is a copolymer of hexafluoropropylene and vinylidene fluoride.

3. A composition as defined in claim 1 wherein said microspheres are included in an amount of 1–4 parts by weight microspheres per 20 parts by weight fluoroelastomer.

4. A composition as defined in claim 1 wherein said microspheres comprise about 20 to about 40 percent based on the total volume of fluoroelastomer plus microspheres.

5. A composition as defined in claim 4 wherein said microspheres comprise hollow glass microballoons having an average diameter in the range of 50 to 150 microns.

6. A composition as defined in claim 1 wherein said microspheres are dispersed throughout said solution of fluoroelastomer and solvent.

7. A composition as defined in claim 1 wherein said solvent comprises a ketone.

* * * * *